Oct. 30, 1934.  H. R. GRAYBILL ET AL  1,979,223

ANIMAL TRAP

Filed May 22, 1934  6 Sheets-Sheet 1

Oct. 30, 1934.  H. R. GRAYBILL ET AL  1,979,223
ANIMAL TRAP
Filed May 22, 1934  6 Sheets-Sheet 2

Oct. 30, 1934.   H. R. GRAYBILL ET AL   1,979,223
ANIMAL TRAP
Filed May 22, 1934     6 Sheets-Sheet 4

Patented Oct. 30, 1934

1,979,223

UNITED STATES PATENT OFFICE

1,979,223

ANIMAL TRAP

Hershey Roy Graybill, Lititz, Melvin B. Koch, Brunnerville, and Harry W. McCreary, Lititz, Pa., assignors to Animal Trap Company of America, Lititz, Pa., a corporation of Pennsylvania Application May 22, 1934, Serial No. 726,890

21 Claims. (Cl. 43—81)

Our invention consists in the novel features hereinafter described, reference being had to the accompanying drawings which illustrate several embodiments of the invention, selected by us for purposes of illustration, and the said invention is fully disclosed in the following description and claims.

The object of our invention is to provide a cheap and efficient trap intended more particularly for mice, rats and other small animals which will be automatically set by simply swinging the striker or jaw from the released to the set position.

Referring to the accompanying drawings,

Fig. 1 is a plan view of a trap embodying the preferred form of our invention, in released position.

Fig. 2 is a side elevation of Fig. 1.

Fig. 3 is a longitudinal section of the trap, showing the parts in an intermediate position, which they occupy when the jaw or striker is swung over into engagement with the locking blade before releasing the striker and permitting the parts to assume their set position.

Fig. 4 is a view similar to Fig. 3, showing the parts in set position.

The leading feature of our invention is the provision, in association with a pivoted locking bar having a detent and a setting shoulder adjacent thereto at its rear end, and a trigger engaging portion at its forward end to engage a trigger carried by the bait pedal, of a setting device so constructed and arranged as to engage the bait pedal, when the trap is being set, and hold the trigger in operative relation with the trigger engaging portion of the locking bar so that when the operator releases the striker and permits it to engage the detent, the trigger engaging portion will be brought into contact with the trigger, thus holding the trap in set position. The setting lever is operatively connected with the locking bar and at least one of said operatively connected parts is provided with a cam portion for engaging the bait pedal and positively raising it into the set position, as the crossbar of the striker is pressed against the setting shoulder of the locking bar. In some instances this raising cam portion may be on the setting device, in some instances it may be on a part of the locking bar, and in some instances it may be on both. The setting device is capable of yielding with respect to the locking bar. It may be connected with the locking bar and be formed of yielding material to enable it to move with respect to the locking bar, or it may be pivoted to the locking bar either at the forward or at the rear end, in which case we prefer to form it with a counter-weighted portion. Where a counter-weighted setting lever is pivotally connected with the locking bar, we also prefer to provide said parts with interengaging stop portions providing a limited amount of relative movement between the parts. In our preferred embodiment of the invention, the trigger and trigger engaging part are so arranged, preferably by depressing them transversely of the trap, that the trap may be sprung either by an upward or a downward movement of the bait carrying portion of the bait pedal instead of by downward movement thereof alone, as in the other forms shown.

Figure 5:
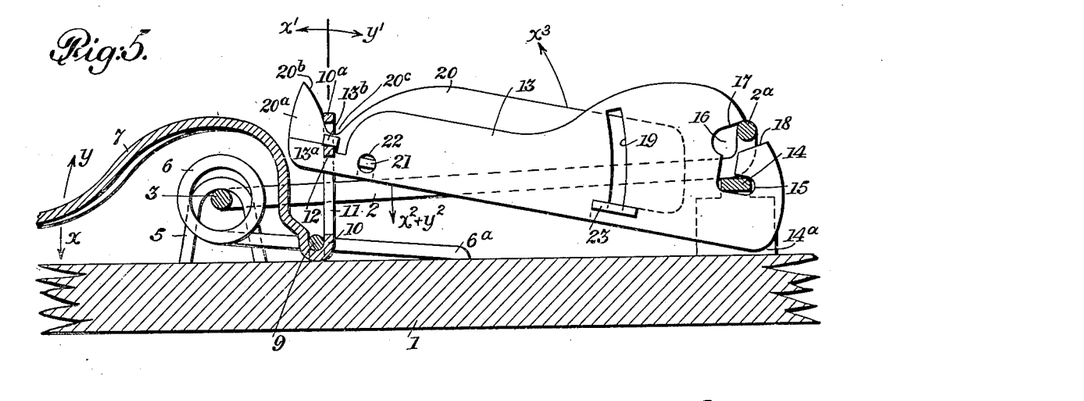
Fig. 5 is a partial view similar to Fig. 4, drawn to an enlarged scale.
Figure 6:
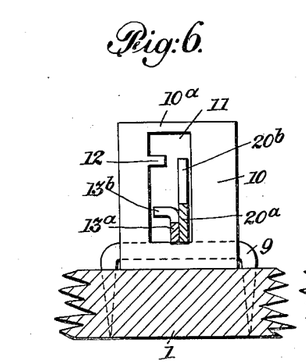
Fig. 6 is a partial transverse sectional view of Fig. 2, on the line 6—6 looking in the direction of the arrows.
Figure 7:
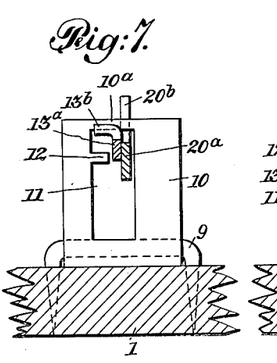
Fig. 7 is a similar view on line 7—7 of Fig. 3.
Figure 8:
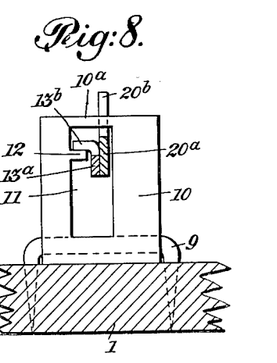
Fig. 8 is a similar view on line 8—8 of Fig. 4.
Figure 9:
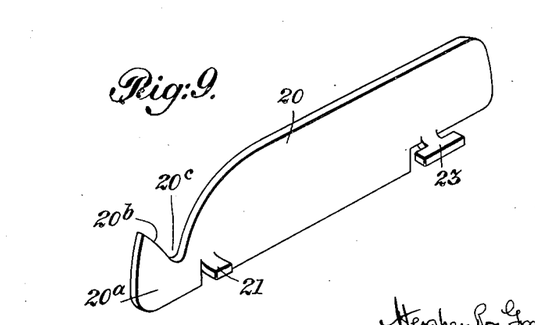
Fig. 9 is a detail perspective view of the counter-weighted setting lever.

Referring to the embodiment of our invention illustrated in Figs. 1 to 10 inclusive, the trap includes the usual base, 1, ordinarily of wood, although it might be made of metal or other suitable material, the striker or jaw, 2, in this instance formed in one piece and having a pivot rod, 3, extending through an eye on one arm of the striker, the rod, 3, being pivotally connected with the base, in this instance by the staples, 5, and the striker being provided with the usual spring, 6, which in this instance is a single spring surrounding the pivot rod. One end of the spring is provided with an arm, 6a, engaging the base, and the other end is provided with an arm, 6b, engaging an arm of the striker. 7 represents the bait pedal having a bait holding portion, 8. The pedal preferably is curved over the spring and pivot bar and is pivotally connected with the base in rear of the spring, in this instance by a staple, 9, which engages a cylindrical portion of the bait pedal. The bait pedal is provided in rear of this pivot, 9, with an upright portion, indicated at 10, which as shown in Figs. 6, 7 and 8, is provided with a vertical slot, 11, having near its upper end a transversely disposed inwardly extending projection, 12, which constitutes the trigger of the trap. 13 represents a locking bar, which is pivotally mounted at its rear end near the rear end of the base, the pivot in this instance being indicated at 14, forming part of a staple, 14a, and engaging a pivotal aperture, 15, in the bar. Above the pivotal aperture the locking bar is provided with a slot, 16, which in this instance is connected at its upper end with the pivotal aperture, but the details of the pivotal support for this locking bar form no part of our present invention. The portion of the locking bar above the slot, 16, forms a locking shoulder, 17, to engage the bail in the set position of the trap, as shown in Fig. 5, and the opposite or lower edge of the slot, 16, forms a setting shoulder, indicated at 18, extending to the rear of the pivotal axis of the bar and adapted to be engaged by the crossbar, 2a, of the striker in setting the trap, to rock the locking bar on its pivot and raise the forward end thereof. The locking bar, 13, is provided at its forward end with a guiding portion, 13a, extending through the slot 11 and provided with a laterally bent trigger engaging arm, 13b, in position to engage the upper side of the trigger, 12, when the trap is set, as indicated in Figs. 4, 5 and 8.

When the parts are in released position, as indicated in Fig. 2, for example, the upright portion, 10, of the bait pedal is inclined slightly forwardly so that when the forward end of the locking bar, 13, is swung upward in setting the trap, the trigger engaging portion, 13b, will pass the trigger, 12, in the slot, 11. In order to insure that the upright portion of the bait pedal carrying the trigger, 12, will be rocked rearwardly for the purpose of bringing the trigger, 12, beneath the trigger engaging portion, 13b, we provide the locking bar, 13, with a counter-weighted setting lever, indicated at 20, which is pivoted to the locking bar, in this instance adjacent to the forward end of the same. This pivotal connection can be formed in any desired manner, but for simplicity we prefer to provide the setting lever, 20, with a struck up pivotal projection, 21, to engage an aperture, 22, and to provide the rear end of the setting lever with means for connecting it to the locking bar while permitting it to rise and fall with respect thereto. In this instance we have shown the locking bar provided with an arcuate slot, 19, and the setting lever provided with a struck up T-headed projection, 23, which can be placed in engagement with the slot in assembling the parts before the pivot, 21, is inserted in the aperture, 22. The engagement of the projection, 23, with the bottom of the slot, 19, provides a stop for arresting the counter-weighted setting lever in its normal or lowest position.

Figure 10:
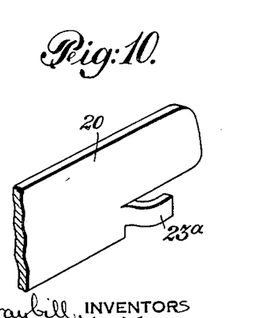
Fig. 10 is a partial view of the same lever, showing a slight modification.

In some instances, instead of using the T-headed projection, 23, we may use an offset projection, as indicated at 23a, in Fig. 10.

The forward end of the setting lever has a guiding portion, 20a, extending into the slot, 11, of the upright portion of the bait pedal, and provided with a curved notch, indicated at 20c, the forward edge of which constitutes an inclined cam, 20b, which is so arranged as to engage the part, 10a, of the upright portion, 10 of the bait pedal above the slot, 11, when the locking bar is elevated in setting the trap, in such manner as to rock the setting lever on its pivotal connection with the locking bar and elevate the rear or counter-weighted portion thereof, in the manner indicated in Fig. 3. At this time the trigger engaging portion, 13b, of the locking bar is carried well above the trigger, 12, as indicated in Fig. 3, and also in Fig. 7, and this position occurs when the striker has been swung over into engagement with the setting shoulder, 18, of the locking bar, as indicated in Fig. 3. The elevation of the forward end of the locking bar has brought the detent or shoulder, 17, into locking relation with the crossbar, 2a, of the striker, as indicated in Fig. 3, so that when the striker is released, it will rise into engagement with the locking shoulder or detent, 17, in the position indicated in Figs. 4 and 5, and at the same time the rear or counterbalanced portion of the setting lever, 20, will drop, due to the release of the upward pressure of the locking bar at its pivotal connection, 21, thereof, and as the setting lever drops into its lowest position, it will rock the cam portion, 20b, rearwardly, thus carrying the trigger, 12, of the upright portion of the bait pedal directly beneath the trigger engaging portion, 13b, of the locking bar, as clearly indicated in Figs. 4, 5 and 8, and thus setting the trap.

One advantage of this embodiment of our invention resides in the fact, which will be apparent at once upon examination of Fig. 5, for example, that to release the trap it is only necessary to move the trigger, 12, from beneath the trigger engaging portion, 13b, of the locking lever, and this may be accomplished by moving it either forwardly or backwardly. This means that the trap may be sprung by the rodent or other animal by depressing the bait carrying end of the bait pedal, in the direction indicated by the arrow X in Fig. 5, in which case the trigger will move forwardly, in the direction indicated at X', in this figure. Or the rodent can spring the trap by pulling upwardly on the bait pedal, as indicated at Y in Fig. 5, in which case the trigger, 12, fill be carried rearwardly, as indicated at Y', so as to pass from beneath the trigger engaging portion, 13b. In either case, as soon as the trigger, 12, disengages the trigger engaging portion, 13b, the forward ends of the locking bar, 13, and of the setting lever, 20, will fall, releasing the crossbar, 2a, of the striker from the detent, 17, and spring the trap. The only difference between the releasing operation by a downward movement of the bait pedal or an upward movement of the same, is that on the downward movement of the bait pedal, the portion, 10a, will press against the cam, 20b, of the setting lever and effect a partial rocking of the same, sufficient to disengage the trigger, 12, from the trigger engaging portion, 13b, in the direction indicated by the arrow X3 in Fig. 5, but the movement of the setting lever in releasing the striker is very slight and will not affect the sensitiveness of the trap. Moreover, it is counteracted somewhat by the weight of the bait and the bait carrying end of the bait pedal, so that as a matter of fact, the trap is sprung as easily by a downward movement or pressure on the bait pedal, as by an upward movement, and has the advantage of being sprung by either movement, which makes the trap especially sensitive and efficient.

In Figs. 11 to 14 we have shown another embodiment of our invention which secures all the advantages of the form just described, except that the trap cannot be released except by a downward movement of the bait carrying end of the bait pedal. In this construction the parts, which are given the same numerals as in the previously described figures with the addition of 100 to avoid repetition, are constructed exactly as hereinbefore described except in the following particulars. In this instance the upright portion, 110, of the bait pedal is provided with a narrow centrally located slot, 111, the portion directly above the slot constituting in itself the trigger, and we have therefore indicated it in these figures by the numeral 112. The forward end of the locking bar, 113, is provided with a recess, 113c, above which extends a trigger engaging shoulder, 113b, the guiding portion, 113a, of said locking bar, which extends through the slot, 111, being also provided preferably on its upper edge with an inclined cam portion, 113d. The counter-weighted setting lever is constructed substantially as hereinbefore described and is pivotally and guidingly connected with the locking bar and operates in substantially the same manner and for the same purposes as previously described with reference to Figs. 1 to 10.

Figure 11:
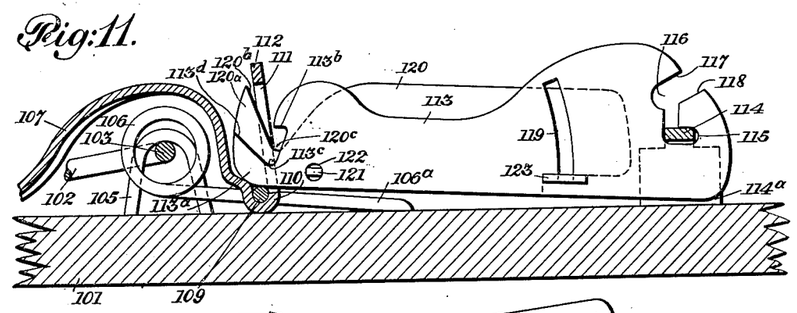
Fig. 11 is a partial sectional view on the scale indicated in Fig. 5, showing a modified embodiment of our invention, the parts being in the released position.
Figure 12:
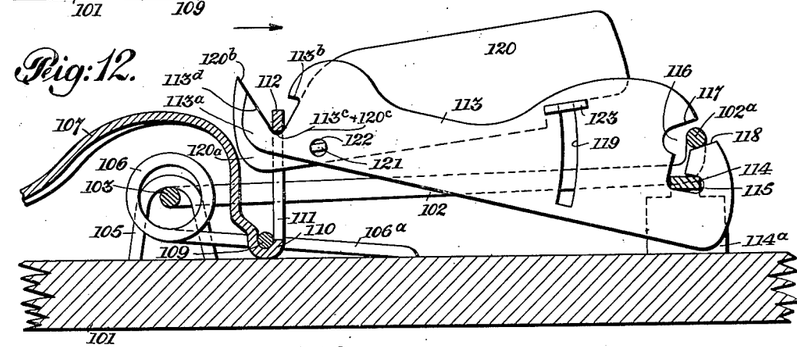
Fig. 12 is a similar view of the trap shown in Fig. 11, showing the parts in an intermediate position which they occupy in setting the trap.
Figure 13:
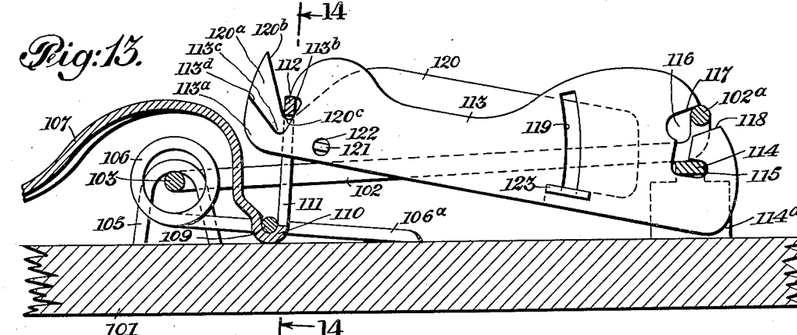
Fig. 13 is a similar view of the trap illustrated in Figs. 11 and 12, in the set position.
Figure 14:
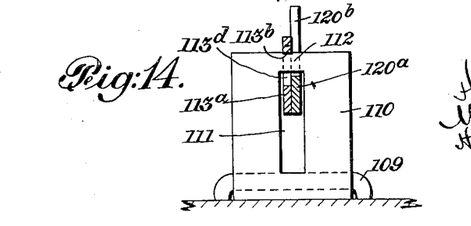
Fig. 14 is a transverse partial sectional view on the line 14—14 of Fig. 13.

Fig. 11 shows the parts in released position. To set the trap the bail is swung over into engagement with the setting shoulder 118, thus tilting the locking bar, 113, causing its forward end to rise and carrying the setting lever upwardly. This brings the cam portion, 120b, of the setting lever into engagement with the trigger portion, 112, of the bait pedal, rocking the bait pedal on its pivot, 109, until the cam portion, 120b, coincides with the inclined cam portion, 113d, of the locking bar, when the effect of both of these cam portions will be to rock the trigger rearwardly in the direction of the arrow in Fig. 12. As the striker, 102, is released by the operator, the crossbar, 102a, will release the shoulder, 118, and engage the detent, 117, permitting the instant drop of the rear end of the counter-weighted setting lever, 120, which, rocking upon its pivotal connection, 121, with the locking lever, causes the cam portion, 120b, of the setting lever to move the trigger, 112, further back and insure its being placed beneath the trigger engaging portion, 113b, of the locking lever, which immediately drops upon it, thus leaving the trap in the set position, as clearly indicated in Fig. 13. In this embodiment of our invention, to release the trap, the bait carrying end of the bait pedal, 107, must be depressed, as will be obvious from the drawings. The setting lever, however, performs the same function of raising the bait pedal into setting position and carrying the trigger beneath the trigger engaging portion of the locking bar, as in the embodiment previously described.

Figure 15:
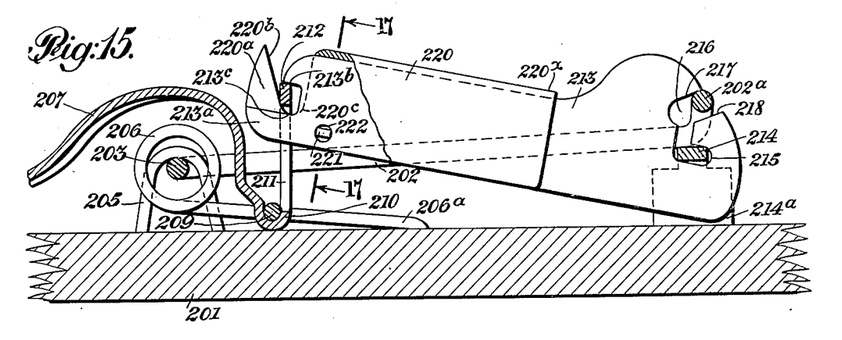
Fig. 15 is a partial sectional view on the same scale as Fig. 5, showing another slightly modified form of trap embodying our invention, the parts being represented in set position.
Figure 17:
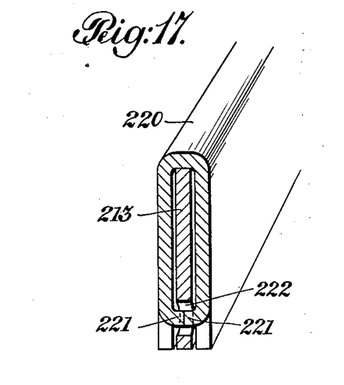
Fig. 17 is a transverse sectional view on line 17—17 of Fig. 15.

In Figs. 15 and 17 we have shown another slight modification of our invention, in which the parts corresponding with those illustrated in Figs. 1 to 10 are given the same numerals with the addition of 200 to avoid repetition. In this embodiment of our invention the locking bar, 213, is constructed and supported exactly as previously described with reference to Figs. 11 to 14 inclusive, except that in this instance the guiding portion, 213a, is shown without the provision of the inclined cam portion, although this is immaterial. The counter-weighted setting lever, 220, in this instance is made of sheet metal and folded in U-shaped form in cross section throughout that portion of its extent from its rear end to a point near the inclined cam, 220b, so that it straddles the locking bar, 213, as clearly shown in the drawings. In this instance we have shown the U-shaped portion of the setting lever provided with inwardly projecting studs, 221, to engage the pivotal aperture, 222, formed in the locking bar, so that in assembling the parts the setting lever can be spread slightly and pressed down over the locking bar until the projections, 221, snap into the pivotal aperture, but this is not important and the parts may be pivoted in any other preferred or usual manner. It will be noted that in this case the guiding slot and T-headed projection for holding the parts in assembled relation are omitted, as the engagement of the U-shaped portion of the setting lever with the locking lever constitutes a guiding engagement between them. One of the parallel portions of the setting lever is extended forwardly through the slot, 211, of the upright portion, 210, of the bait pedal, and is provided with the cam portion, 220b, to rock the bait pedal when the trap is set and carry the trigger, 212, into setting relation with the trigger engaging portion, 213b, of the locking bar. The setting lever is arrested in its lowest position by the engagement of the bent or folded portion, 220x, with the upper edge of the locking bar, as indicated in Fig. 15.

The operation of the device is substantially the same as that previously described with reference to Figs. 11 to 14 inclusive, and need not be repeated.

Figure 16:
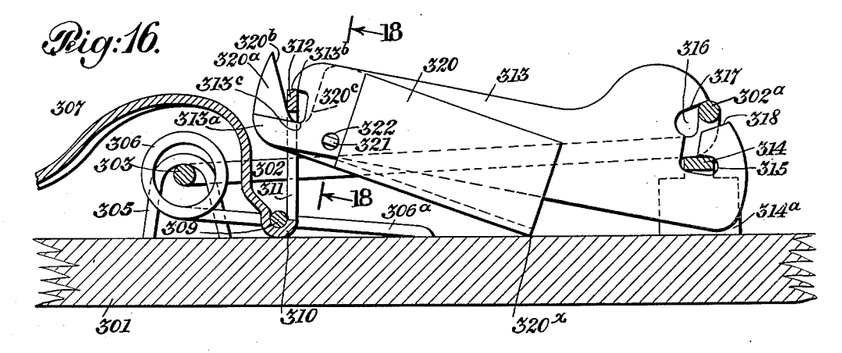
Fig. 16 is a similar view of another embodiment of our invention.
Figure 18:
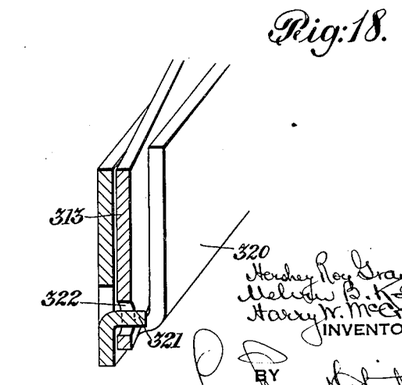
Fig. 18 is a transverse sectional view on line 18—18 of Fig. 16.

In Figs. 16 and 18 we have illustrated another modification of our invention, in which the parts corresponding with those previously described with reference to Figs. 1 to 10 are given the same numerals with the addition of 300. In this embodiment we have shown the locking bar, 313, of the same form as that illustrated in Figs. 1 to 14, and in Fig. 15, and operating in the same manner. In this instance the counter-weighted setting lever, 320, has its weighted portion formed by bending a sheet of metal into U-shape in cross section, with its opposite faces parallel and adapted to embrace the locking bar between the parallel portions, but in this instance the U-shaped portions are reversed from the position shown in Fig. 15, so that in the normal and set positions of the trap, the rear end of the setting lever rests upon the base, 301, as indicated at 320x. The setting lever is pivotally mounted on the locking lever adjacent to the forward end of the latter by any suitable means, and in this instance we have shown one of the parallel portions of the setting lever provided with a single stud, 321, adapted to pass through the pivotal aperture, 322, in the locking bar. The adjacent forward end of the opposite parallel portion of the setting lever is shown as cut away to accommodate this projection, 321, but this is not important. One of the parallel portions of the setting lever extends forwardly through the slot, 311, in the upright portion, 310, of the bait pedal, and is provided with the cam portion, 320b, as previously described. This cam portion, 320b, will, however, be so formed that in the set position of the trap, indicated in Fig. 16, it will place the trigger, 312, in operative setting position with respect to and beneath the trigger engaging portion, 313b, when the setting lever falls to its lowest position and is arrested by coming in contact with the base, at 320x, as illustrated in Fig. 16.

Figure 19:
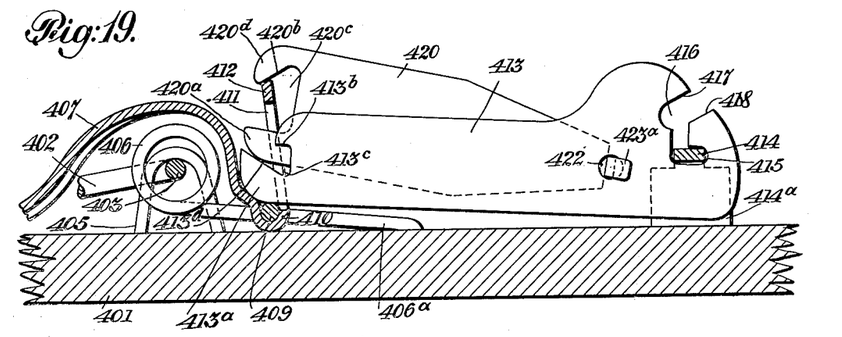
Fig. 19 is a partial sectional view on the scale indicated in Fig. 5, showing another modified embodiment of our invention, the parts being shown in the released position.
Figure 20:
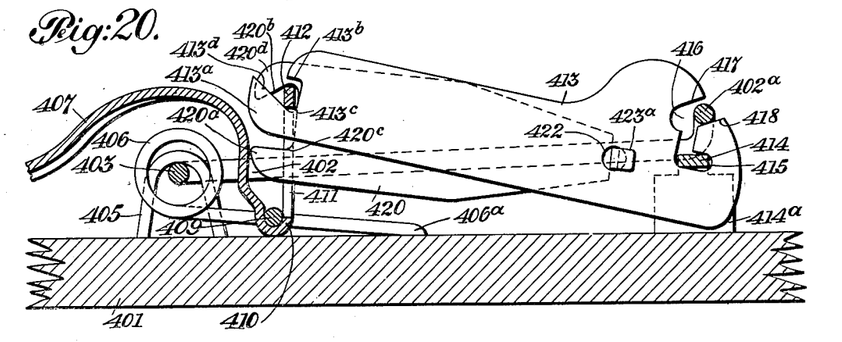
Fig. 20 is a view similar to Fig. 19, showing the parts in an intermediate position, brought about in setting the same.
Figure 21:
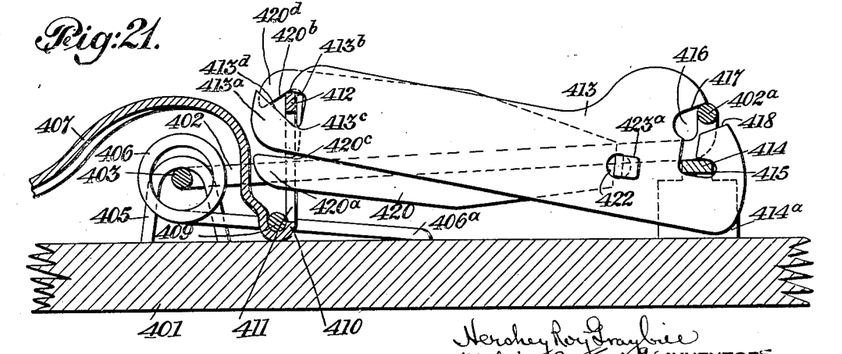
Fig. 21 is a similar view showing the same trap with the parts in set position.

In Figs. 19 to 21 inclusive, we have illustrated another modification of our invention, in which the parts corresponding with those previously described with reference to Figs. 1 to 10 inclusive, are given the same reference numerals with the addition of 400 to avoid repetition. In this embodiment of our invention, the counter-weighted setting lever, 420, is pivotally connected to the locking bar adjacent to the rear end of the locking bar instead of at its forward end, and is provided at its forward end with a downwardly extending cam portion, 420b, to engage the upright portion of the bait pedal. In this instance the locking bar, 413, is constructed substantially as illustrated in Figs. 10 to 14, except that it is provided with a pivotal aperture, 422, adjacent to its rear end, in this instance slightly forward of its pivotal support, 414, and the rear end of the setting lever is provided with an inwardly bent or off-set projection, 423a, similar to the projection 23a, in Fig. 10, which can be inserted in the aperture, 422, in assembling the parts, or the pivotal connection can be formed in any desired manner. The forward end of the locking bar is provided with a portion, 413a, extending through the slot, 411, in the upright portion, 410, of the bait pedal, the recess, 413c, the inclined cam portion 413d, and the trigger engaging portion, 413b. The forward end of the setting lever is also provided with a guiding portion, 420a, extending through the slot, 411, and lying beside the guiding portion, 413a, of the locking bar, the slot, 411, being of such width as to hold the parts in parallelism while permitting their relative movement and preventing the disengagement of the projection, 423a, from the aperture, 422. Above the guiding portion, 420a, the setting lever is provided with a notch or recess, 420c, above which is a projecting portion, 420d, the lower edge of which is inclined and forms the cam, 420b, above referred to. This inclined cam portion, 420b, rests upon the trigger, 412, on the upright portion of the bait pedal when the trap is in the released position, as shown in Fig. 19, and thus holds the setting lever in raised position with respect to the locking bar, 413.

When the striker is brought into engagement with the setting shoulder, 418, to depress the rear end of the locking bar and raise its forward end, the inclined cam portion 413d, of the locking bar engages the lower edge of the trigger portion, 412, and rocks the upright portion of the bait pedal rearwardly, in the direction of the arrow in Fig. 20, carrying the trigger beneath the trigger engaging portion, 413b, of the locking bar. This moves the trigger, 412, rearwardly in contact with the inclined cam edge, 420b, of the setting lever, the forward end of which drops into the position shown in Fig. 20, and the friction between the cam portion, 420, and the trigger will hold the trigger in proper relation with the trigger engaging portion, 413b, so that when the operator releases the striker, 402, and the crossbar, 402a, thereof, engages the locking shoulder, 417, thus depressing the forward end of the locking bar, the trigger engaging portion, 413b, thereof, will engage the upper edge of the trigger, 412, as shown in Fig. 21, and the trap is in set position.

This form of trap, like the forms shown in Figs. 10 to 14, Figs. 15 and 17, and Figs. 16 and 18, can only be released by a downward movement of the bait carrying end of the bait pedal, which in this instance will raise the setting lever to its normal position, shown in Fig. 19, when the trap is sprung. In all the embodiments of the invention the counter-weighted setting lever, after the trap is set, performs a further function in holding the trigger in operative set relation with the trigger engaging portion of the locking bar, so that the springing of the trap by depressing the bait carrying end of the bait pedal will raise the free end of the setting lever with respect to the locking bar when the trap is sprung. The resistance offered by the setting lever to the springing of the trap, however, is comparatively small, and while the setting lever in these embodiments of our invention acts to prevent accidental springing of the trap, it does not materially detract from the sensitiveness of the trap in releasing the striker.

In the case of the embodiment of our invention illustrated in Figs. 1 to 10 inclusive, as previously set forth, the trap can be released by either a downward movement of the bait carrying end of the bait pedal, or an upward movement of the same, and in the upward movement to spring the trap, the setting lever will not be raised.

Figure 22:
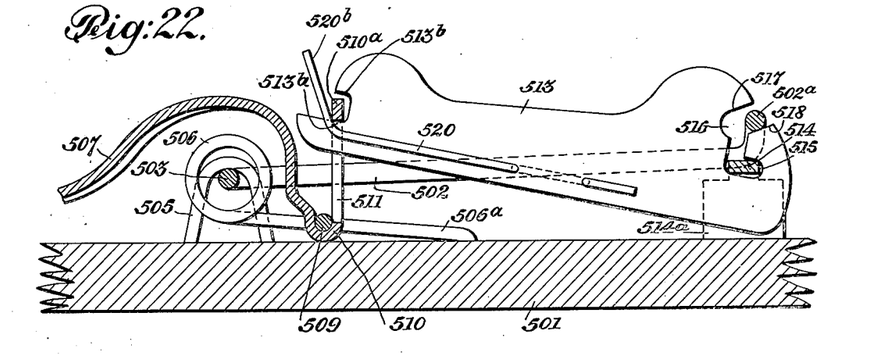
Fig. 22 is a view similar to Fig. 5, showing a further modification, the parts being illustrated in the positions to which they are moved in setting the trap just before the striker is released by the operator and placed in control of the detent.

In Fig. 22, in which the parts corresponding with those shown in Figs. 1 to 10 inclusive are given the same reference characters with the addition of 500, we have shown the setting device, 520, without a counter-weighted portion, and comprising a rod or wire, which is preferably of resilient material, as spring wire, having its rearward end rigidly secured to the locking bar, 513. The forward end of the locking bar extends through the slotted portion in the bait pedal below the trigger portion, and the forward end of the setting device also extends through said slot and is bent upwardly to form a cam portion, 520b, to engage the upper end of the slotted portion of the bait pedal, and raise the bait pedal to setting position when the crossbar of the striker is pressed against the setting shoulder, 518, as shown in Fig. 22. This brings the trigger directly below the trigger engaging portion, 513b, of the locking bar and the setting device holds the trigger in that position so that when the striker is released and placed in control of the detent, 517, thereby slightly rocking the locking bar, the trigger engaging portion, 513b, will engage the trigger, leaving the parts in set position. When the trap is sprung, the forward movement of the trigger removes it from engagement with the locking bar, the setting device yielding to permit this disengagement.

Figure 23:
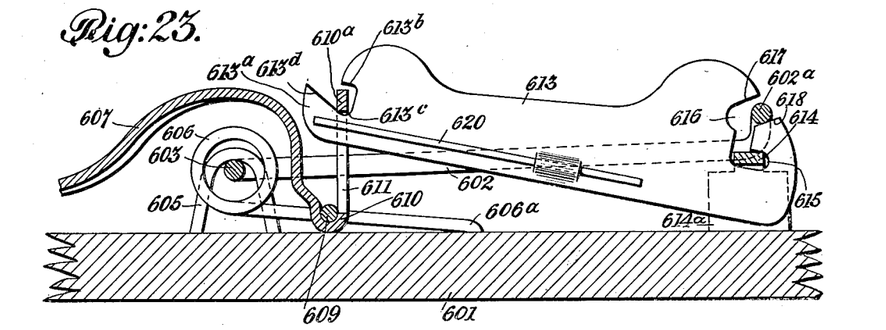
Fig. 23 is a view similar to Fig. 22, showing another slight modification of the invention.
Figure 24:
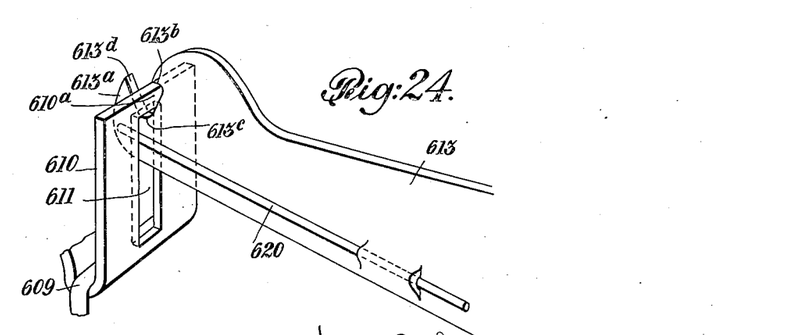
Fig. 24 is a detail perspective of the parts shown in Fig. 23.

In Figs. 23 and 24 we have shown another slight modification of the invention, in which the parts corresponding with those shown in Figs. 1 to 10 inclusive have been given the same reference characters with the addition of 600. In this construction the forward end of the locking bar, which passes through the slot in the bait pedal, is provided with the raising cam portion, here indicated at 613d, and the setting device comprises a yielding rod or bar, preferably of resilient material, the rear end of which is secured to the locking bar, and the forward end of which extends through the slot in the bait pedal, and frictionally engages the adjacent side or edge of the slot, effecting a frictional engagement with the bait pedal which serves to hold the triger in operative relation with the trigger engaging portion of the locking bar in setting the trap, as shown in Fig. 23, until said trigger engaging portion is permitted to engage the trigger, when the operator releases the striker and permits it to engage the detent of the locking bar.

What we claim and desire to secure by Letters Patent is:

1. A trap comprising a base, a spring actuated striker pivoted thereto, a pivoted bait pedal having a portion provided with a trigger, a locking bar pivoted to the base and provided with a trigger engaging portion, and a setting device attached to the locking bar and having a portion for engaging the bait pedal to hold the trigger in operative relation with the trigger engaging portion of the locking bar until the trigger is engaged thereby.

2. A trap comprising a base, a spring actuated striker pivoted thereto, a pivoted bait pedal having a portion provided with a trigger, a locking bar pivoted to the base and provided with a trigger engaging portion, and a setting device operatively connected with the locking bar and having a portion for engaging the bait pedal to hold the trigger in operative relation with the trigger engaging portion of the locking bar until the trigger is engaged thereby, one of said operatively connected parts having a cam portion for positively raising the bait pedal to bring the trigger into operative relation with the locking bar in setting the trap.

3. A trap comprising a base, a spring actuated striker pivoted thereto, a pivoted bait pedal having a portion provided with a trigger, a locking bar pivoted to the base and provided adjacent to its rear end with a locking detent, and with a setting shoulder in the path of the striker, and being provided adjacent to its forward end with a trigger engaging portion, and a setting device attached to said locking bar and having portions movable with respect thereto for engaging the bait pedal to hold the trigger in operative relation with the trigger engaging portion of the locking bar until the trigger is engaged thereby, one of said connected parts being provided with a cam portion for positively raising the bait pedal into operative relation with the locking bar in setting the trap.

4. A trap comprising a base, a spring actuated striker pivoted thereto, a pivoted bait pedal having a portion provided with a trigger, a locking bar pivoted to the base and provided adjacent to its rear end with a locking detent and with a setting shoulder in the path of the striker, and being provided adjacent to its forward end with a trigger engaging portion, and a yielding setting device operatively connected with the locking bar and having a portion for engaging the bait pedal to hold the trigger in operative relation with the trigger engaging portion of the locking bar until the trigger is engaged thereby, one of said connected parts being provided with a cam portion for positively raising the bait pedal into operative relation with the locking bar in setting the trap.

5. A trap comprising a base, a spring actuated striker pivoted thereto, a pivoted bait pedal having a portion provided with a trigger, a locking bar pivoted to the base and provided at its rear end with a locking detent, and a setting shoulder in the path of the striker, and at the forward end with a trigger engaging portion, and a counter weighted setting lever pivotally connected with the locking bar and having a portion for engaging the bait pedal to hold the trigger in operative relation with the trigger engaging portion of the locking bar until the trigger is engaged thereby.

6. A trap comprising a base, a spring actuated striker pivoted thereto, a pivoted bait pedal having a portion provided with a trigger, a locking bar pivoted to the base and provided at its rear end with a locking detent, and a setting shoulder in the path of the striker and at the forward end with a trigger engaging portion, and a counterweighted setting lever pivotally connected with the locking bar and having a portion for engaging the bait pedal to hold the trigger in operative relation with the trigger engaging portion of the locking bar until the trigger is engaged thereby, one of said pivotally connected parts having a cam portion for engaging a part connected with the bait pedal to raise it and bring the trigger into operative relation with the trigger engaging portion of the locking bar.

7. A trap comprising a base, a spring actuated striker pivoted thereto, a pivoted bait pedal having a portion provided with a trigger, a locking bar pivoted to the base and provided at its rear end with a locking detent, and a setting shoulder in the path of the striker and at the forward end with a trigger engaging portion, and a counter weighted setting lever pivotally connected with the locking bar, and having a cam portion for engaging a part connected with the bait pedal to positively raise it and hold it in raised position until the trigger is engaged by the trigger engaging portion of the locking bar.

8. A trap comprising a base, a spring actuated striker pivoted thereto, a pivoted bait pedal having a portion provided with a trigger, a locking bar pivoted to the base and provided at its rear end with a locking detent, and a setting shoulder in the path of the striker and at the forward end with a trigger engaging portion, and a counterweighted setting lever pivotally connected with the locking bar, one of said pivotally connected parts having a cam portion for engaging a part connected with the bait pedal to raise it and bring the trigger into the path of and beneath the trigger engaging portion of the locking bar.

9. A trap comprising a base, a spring actuated striker pivoted thereto, a pivoted bait pedal having a portion provided with a trigger, a locking bar pivoted to the base and provided at its rear end with a locking detent, and a setting shoulder in the path of the striker and at the forward end with a trigger engaging portion, having its path of movement out of line with the trigger in the released position of the trap, and a counterweighted setting lever pivotally connected with the locking bar and provided with a cam portion for engaging the bait pedal and moving the trigger into the path of said trigger engaging portion and holding it in set position until the trigger is engaged by the said trigger engaging portion of the locking bar.

10. A trap comprising a base, a spring actuated striker pivoted thereto, a pivoted bait pedal having a portion provided with a vertically disposed guiding slot and a trigger, a locking bar pivoted to the base and provided at its rear end with a locking detent and with a setting shoulder in the path of the striker and provided at its forward end with a guiding portion extending through said slot, and with a trigger engaging portion, and a counterweighted setting lever pivotally connected to the locking bar and having a forwardly extending guiding portion projecting through said guiding slot and provided with a cam portion for engaging a part connected with the bait pedal.

11. A trap comprising a base, a spring actuated striker pivoted thereto, a pivoted bait pedal having an upright portion provided with a vertically disposed guiding slot and a trigger, a locking bar pivoted to the base and provided at its rear end with a locking detent and with a setting shoulder in the path of the striker and provided at its forward end with a guiding portion extending through said slot, and with a trigger engaging portion having its path of movement in rear of the trigger in the released position of the trap, and a counterweighted setting lever pivotally connected with the locking bar, and having a forwardly extending guiding portion projecting through said guiding slot and provided with a rearwardly and downwardly extending cam portion for engaging a part connected with the bait pedal to bring the trigger into operative relation with the trigger engaging portion of the locking bar and hold it until it is engaged thereby.

12. A trap comprising a base, a spring actuated striker pivoted thereto, a pivoted bait pedal having a portion provided with a trigger, a locking bar pivoted to the base and provided with a trigger engaging portion, and a counterweighted setting lever operatively connected with the locking bar and movable with respect thereto, and having a portion for engaging the bait pedal to hold the trigger in operative relation with the trigger engaging portion of the locking bar until the trigger is engaged thereby, one of said operatively connected parts having a cam portion for positively raising the bait pedal to bring the trigger into operative relation with the trigger engaging portion of the locking bar, said operatively connected parts having interengaging guiding means for maintaining them in parallelism.

13. A trap comprising a base, a spring actuated striker pivoted thereto, a pivoted bait pedal having a part provided with a transversely disposed trigger, a locking bar pivoted to the base provided at its rear end with a locking detent and with a setting shoulder in the path of the striker, and provided at its forward end with a transversely projecting trigger engaging portion adapted to rest upon the trigger in the set position of the trap but having its path of movement out of line with the trigger when the parts are in released position, a counter-weighted setting lever pivotally connected with the locking bar adjacent to its forward end and provided with a cam portion for raising the bait pedal and bringing the trigger into operative relation with and beneath the trigger engaging portion of the locking bar, whereby the trap may be released by a rocking movement of the bait pedal in either direction.

14. A trap comprising a base, a spring actuated striker pivoted thereto, a pivoted bait pedal having an upright portion provided with a guiding slot, and a horizontally and transversely disposed trigger portion extending inwardly from one side of said slot, a locking bar pivoted to the base and provided at its rear end with a locking detent, and with a setting shoulder in the path of the striker, and provided at its forward end with a guiding portion extending into said slot and having a transversely extending trigger engaging portion adapted to rest on the trigger in the set position of the trap, and a counterweighted setting lever pivotally connected with the locking bar adjacent to the forward end of the same, and having a guiding portion extending through said slot and provided with a downwardly and rearwardly extending cam portion for engaging a part connected with the upright portion of the pedal to raise the pedal, bringing the trigger into operative relation with and beneath the trigger engaging portion of the locking bar and hold it in said position until the trigger is engaged thereby, whereby the trap may be sprung by a movement of the bait pedal on its pivot in either direction.

15. A trap comprising a base, a spring actuated striker pivoted thereto, a pivoted bait pedal having a part provided with a transversely disposed trigger, a locking bar pivoted to the base provided at its rear end with a locking detent and with a setting shoulder in the path of the striker and provided at its forward end with a transversely projecting trigger engaging portion adapted to rest upon the trigger in the set position of the trap but having its path of movement out of line with the trigger when the parts are in released position, a counterweighted setting lever pivotally connected with the locking bar adjacent to its forward end and provided with a cam portion for raising the bait pedal and bringing the trigger into operative relation with and beneath the trigger engaging portion of the locking bar, whereby the trap may be released by a rocking movement of the bait pedal in either direction, the said locking bar and setting lever being both provided with interengaging portions for holding them in parallelism.

16. A trap comprising a base, a spring actuated striker pivoted thereto, a pivoted bait pedal having an upright portion provided with a vertically disposed guiding slot and a trigger, a locking bar pivoted to the base and provided at its rear end with a locking detent and with a setting shoulder in the path of the striker and provided at its forward end with a guiding portion extending through said slot, and with a trigger engaging portion, a counterweighted setting lever pivotally connected with the locking bar adjacent to its forward end by means comprising a pivotal projection secured to one of said parts and extending through a pivotal aperture in the other, the said parts being provided at a distance from said pivotal connection with interengaging means for holding them in parallelism and preventing the disengagement of said pivotal connection, said setting lever having a guiding portion extending through said slot in the bait pedal and provided with a downwardly and rearwardly extending cam portion for raising the bait pedal and moving the trigger into and holding it in operative relation with the trigger engaging portion of the locking bar, the guiding engagement of the locking bar and the setting lever with said slot in the bait pedal also preventing the disengagement of the parts of said pivotal connection.

17. A trap comprising a base, a spring actuated striker pivoted thereto, a pivoted bait pedal having an upright portion provided with a vertically disposed guiding slot and a trigger portion above said slot, a locking bar pivoted to the base and provided at its rear end with a locking detent and with a setting shoulder in the path of the striker, and provided at its forward end with a guiding portion extending through said slot, and with a trigger engaging portion adapted to rest upon said trigger in the set position of the trap, but having its path of movement in rear of said trigger in the released position of the trap, and a counterweighted setting lever pivotally connected to the locking bar adjacent to the forward end thereof and having a guiding portion extending through said slot and provided with a downwardly and rearwardly extending cam portion for engaging the upper end of the slot to raise the bait pedal, carry the trigger rearwardly beneath the trigger engaging portion of the locking bar and hold the trigger in set position until it is engaged by the said trigger engaging portion.

18. A trap comprising a base, a spring actuated striker pivoted thereto, a pivoted bait pedal having an upright portion provided with a trigger, a locking bar pivoted to the base and provided at its rear end with a locking detent, and a setting shoulder in the path of the striker and at the forward end with a trigger engaging portion and with a cam for engaging a part connected with the bait pedal to raise it and bring the trigger into operative relation with the trigger engaging portion of the locking bar, and a counterweighted setting lever pivotally connected with the locking bar and provided with a portion for engaging the upright portion of the bait pedal to hold the trigger in operative relation with the trigger engaging portion of the locking bar until the trigger is engaged thereby.

19. A trap comprising a base, a spring actuated striker pivoted thereto, a pivoted bait pedal having an upright portion provided with a trigger, a locking bar pivoted to the base and provided at its rear end with a locking detent, and a setting shoulder in the path of the striker and at the forward end with a trigger engaging portion and with a cam for engaging a part connected with the bait pedal to raise it and bring the trigger into operative relation with and beneath the trigger engaging portion of the locking bar, and a counterweighted setting lever pivotally connected with the locking bar adjacent to the rear end thereof, and having a forwardly extending portion projecting beyond the upright portion of the bait pedal and provided with an inclined cam portion for engaging the same and holding the trigger in operative relation with the locking bar until engaged by the trigger engaging portion thereof.

20. A trap comprising a base, a spring actuated striker pivoted thereto, a pivoted bait pedal having an upright portion provided with a vertically disposed guiding slot, and a trigger portion above said slot, a locking bar pivoted to the base and provided at its rear end with a locking detent and with a setting shoulder in the path of the striker and provided at its forward end with a trigger engaging portion and with a guiding part extending through said slot and having a cam edge for engaging the upright portion of the pedal above the slot to raise the pedal and bring the trigger into operative relation with the locking bar, and a counterweighted setting lever pivotally connected with the locking bar adjacent to the rear end thereof and provided at its forward end with a guiding portion extending through said slot, and a portion extending forwardly above the trigger and provided with a cam edge for engaging the same to hold the trigger in operative relation with the locking bar until it is engaged thereby.

21. A trap comprising a base, a spring actuated striker pivoted thereto, a pivoted bait pedal having an upright portion provided with a vertically disposed guiding slot, and a trigger portion above said slot, a locking bar pivoted to the base and provided at its rear end with a locking detent and with a setting shoulder in the path of the striker and provided at its forward end with a trigger engaging portion and with a guiding part extending through said slot and having a cam edge for engaging the upright portion of the bait pedal above the slot to raise the pedal and bring the trigger into operative relation with the locking bar, and a counterweighted setting lever pivotally connected with the locking bar adjacent to the rear end thereof and provided at its forward end with a guiding portion extending through said slot, and a portion extending forwardly above the trigger and provided with a cam edge for engaging the same to hold the trigger in operative relation with the locking bar until it is engaged thereby, the pivotal connection between the locking bar and setting lever comprising an offset portion secured to one of said parts, and a pivotal aperture in the other, the engagement of the guiding portions of said parts with the slot in the upright portion of the bait pedal holding said parts in parallelism and preventing the disengagement of the parts of said pivotal connection.

HERSHEY ROY GRAYBILL.
MELVIN B. KOCH.
HARRY W. McCREARY.